US008944165B2

(12) United States Patent
Patil et al.

(10) Patent No.: US 8,944,165 B2
(45) Date of Patent: Feb. 3, 2015

(54) CEMENT COMPOSITION CONTAINING AN ADDITIVE OF A POZZOLAN AND A STRENGTH RETROGRESSION INHIBITOR

(71) Applicant: Halliburton Energy Services, Inc., Houston, TX (US)

(72) Inventors: Rahul C. Patil, Pune (IN); Ramesh Muthusamy, Pune (IN); Sheetal Singh, Pune (IN); Abhimanyu Deshpande, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 13 days.

(21) Appl. No.: 13/739,992

(22) Filed: Jan. 11, 2013

(65) Prior Publication Data

US 2014/0196901 A1    Jul. 17, 2014

(51) Int. Cl.
*E21B 33/13* (2006.01)
*C09K 8/467* (2006.01)
*C04B 14/00* (2006.01)

(52) U.S. Cl.
CPC ............... *C09K 8/467* (2013.01); *C04B 14/00* (2013.01); *E21B 33/13* (2013.01)
USPC .......................................... 166/292; 507/269

(58) Field of Classification Search
None
See application file for complete search history.

(56) References Cited

U.S. PATENT DOCUMENTS

| | | | |
|---|---|---|---|
| 2,805,719 A | 9/1957 | Anderson | |
| 3,595,642 A | 7/1971 | Miller | |
| 4,935,060 A | 6/1990 | Dingsoyr | |
| 4,957,556 A | 9/1990 | Kunbargi | |
| 5,149,370 A | 9/1992 | Olaussen et al. | |
| 5,851,282 A | 12/1998 | Odler | |
| 6,989,057 B2 * | 1/2006 | Getzlaf et al. | 106/606 |
| 7,213,646 B2 | 5/2007 | Roddy et al. | |
| 7,238,733 B2 | 7/2007 | Vijn et al. | |
| 7,337,842 B2 | 3/2008 | Roddy et al. | |
| 7,338,925 B2 * | 3/2008 | Santra et al. | 507/267 |
| 7,381,263 B2 | 6/2008 | Roddy et al. | |
| 7,393,407 B2 | 7/2008 | Dingsoyr et al. | |
| 7,559,369 B2 | 7/2009 | Roddy et al. | |
| 7,631,692 B2 | 12/2009 | Roddy et al. | |
| 7,784,542 B2 | 8/2010 | Roddy et al. | |
| 7,806,183 B2 | 10/2010 | Roddy et al. | |
| 7,892,352 B2 | 2/2011 | Roddy et al. | |
| 2009/0288830 A1 | 11/2009 | Perera et al. | |
| 2010/0282466 A1 | 11/2010 | Brenneis et al. | |
| 2010/0313795 A1 | 12/2010 | Guynn et al. | |

OTHER PUBLICATIONS

Walker, R. and S. Pavía. "Physical properties and reactivity of pozzolans, and their influence on the properties of lime-pozzolan pastes." Materials and Structures, Jul. 2011, vol. 44, Issue 6, 1139-1150. Published online Nov. 20, 2010.*
Pinheiro et al., "Pozzolanic Activity of Recycled Red Ceramic Bricks," Second International Conference on Sustainable Construction Materials and Technologies, Jun. 28-Jun. 30, 2010.*
Ghorab et al., "Interaction between cements with different composition and superplasticizers," Materiales de Construcción, 62, 308, pp. 359-380, Jul.-Sep. 2012.*
Halliburton, Pozmix A, Cement Additive, Halliburton Product Sheet, US.
Halliburton, SSA-1, Strength-Stabilizing Agent, Halliburton Product Sheet, H01340, 2007, US.
Halliburton, SSA-2, Coarse Silica Flour, Halliburton Product Sheet, H02026, 2007, US.
Revil, Successful use of a liquid strength retrogression prevention additive, Paper presented at the Offshore Mediterranean Conference (OMC) & Exhibition in Ravenna, Italy, Mar. 28-30, 2007, pp. 1-15.
Ostroot, Improved Compositions for Cementing Wells with Extreme Temperatures, Journal of Petroleum Technology, Society of Petroleum Engineers, SPE 1513-G, Mar. 1961, pp. 277-284.

* cited by examiner

*Primary Examiner* — Angela M DiTrani
*Assistant Examiner* — Andrew H Sue-Ako
(74) *Attorney, Agent, or Firm* — Craig W. Roddy; Sheri Higgins Law; Sheri Higgins

(57) ABSTRACT

A cement composition comprises: cement; water; and an additive, wherein the additive is a pozzolan and a strength-retrogression inhibitor, and wherein a mixture consisting essentially of: the additive; water; and a source of calcium develops a compressive strength of at least 500 psi at a time of 24 hours, a temperature of 190° F., and a pressure of 3,000 psi. A method of cementing in a subterranean formation comprises: introducing the cement composition into the subterranean formation and allowing the cement composition to set. The compressive strength of the test cement composition consisting essentially of: the cement; the water; and the additive at a final time of 72 hours has a percent change greater than −5% from the compressive strength of the test cement composition at an initial time of 24 hours when tested at a temperature of 300° F. and a pressure of 3,000 psi.

18 Claims, No Drawings

CEMENT COMPOSITION CONTAINING AN ADDITIVE OF A POZZOLAN AND A STRENGTH RETROGRESSION INHIBITOR

TECHNICAL FIELD

Cement compositions and methods of use are provided. The cement compositions include an additive. The additive is a pozzolan and a strength retrogression inhibitor. As a pozzolan, the additive can be included in the cement composition to decrease the cost of the composition without adversely affecting the desirable properties, such as setting time and compressive strength, of the cement composition. As a strength retrogression inhibitor, the additive can inhibit or prevent a decline of the compressive strength of the cement composition over time.

SUMMARY

According to an embodiment, a method of cementing in a subterranean formation comprises: introducing a cement composition into the subterranean formation, wherein the cement composition comprises: cement; water; and an additive, wherein the additive is a pozzolan and a strength-retrogression inhibitor; and allowing the cement composition to set, wherein the step of allowing is performed after the step of introducing.

According to another embodiment, a method of cementing in a subterranean formation comprises: introducing a cement composition into the subterranean formation, wherein the cement composition comprises: cement; water; and an additive, wherein the additive is a pozzolan and a strength-retrogression inhibitor, and wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa), wherein a test cement composition consisting essentially of: the cement; the water; and the additive, and in the same proportions as in the cement composition develops a compressive strength of at least 1,800 psi (12.4 MPa) when tested at 24 hours, a temperature of 190° F. (88° C.), and a pressure of 3,000 psi (20.7 MPa), and wherein the compressive strength of the test cement composition at a final time of 72 hours has a percent change greater than −5% from the compressive strength of the test cement composition at an initial time of 24 hours when tested at a temperature of 300° F. (149° C.) and a pressure of 3,000 psi (20.7 MPa); and allowing the cement composition to set, wherein the step of allowing is performed after the step of introducing.

According to another embodiment, a cement composition comprises: cement; water; and an additive, wherein the additive is a pozzolan and a strength-retrogression inhibitor, and wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa).

DETAILED DESCRIPTION

As used herein, the words "comprise," "have," "include," and all grammatical variations thereof are each intended to have an open, non-limiting meaning that does not exclude additional elements or steps.

As used herein, the words "consisting essentially of," and all grammatical variations thereof are intended to limit the scope of a claim to the specified materials or steps and those that do not materially affect the basic and novel characteristic(s) of the claimed invention. For example, a test cement composition can consist essentially of cement, water, and the additive. The test cement composition can include other ingredients so long as the presence of the other ingredients does not materially affect the basic and novel characteristics of the claimed invention (e.g., the compressive strength of the cement composition).

As used herein, a "fluid" is a substance having a continuous phase that tends to flow and to conform to the outline of its container when the substance is tested at a temperature of 71° F. (22° C.) and a pressure of one atmosphere "atm" (0.1 megapascals "MPa"). A fluid can be a liquid or gas. A homogenous fluid has only one phase, whereas a heterogeneous fluid has more than one distinct phase. A colloid is an example of a heterogeneous fluid. A colloid can be: a slurry, which includes a continuous liquid phase and undissolved solid particles as the dispersed phase; an emulsion, which includes a continuous liquid phase and at least one dispersed phase of immiscible liquid droplets; or a foam, which includes a continuous liquid phase and a gas as the dispersed phase.

As used herein, a "cement composition" is a mixture of at least cement and water. A cement composition can include additives. As used herein, the term "cement" means an initially dry substance that, in the presence of water, acts as a binder to bind other materials together and set. An example of cement is Portland cement. A cement composition is generally a slurry in which the water is the continuous phase of the slurry and the cement (and any other insoluble particles) is the dispersed phase. The continuous phase of a cement composition can include dissolved solids.

Oil and gas hydrocarbons are naturally occurring in some subterranean formations. A subterranean formation containing oil or gas is sometimes referred to as a reservoir. A reservoir may be located under land or off shore. Reservoirs are typically located in the range of a few hundred feet (shallow reservoirs) to a few tens of thousands of feet (ultra-deep reservoirs). In order to produce oil or gas, a wellbore is drilled into a reservoir or adjacent to a reservoir.

A well can include, without limitation, an oil, gas, or water production well, or an injection well. As used herein, a "well" includes at least one wellbore. A wellbore can include vertical, inclined, and horizontal portions, and it can be straight, curved, or branched. As used herein, the term "wellbore" includes any cased, and any uncased, open-hole portion of the wellbore. A near-wellbore region is the subterranean material and rock of the subterranean formation surrounding the wellbore. As used herein, a "well" also includes the near-wellbore region. The near-wellbore region is generally considered to be the region within about 100 feet of the wellbore. As used herein, "into a well" means and includes into any portion of the well, including into the wellbore or into the near-wellbore region via the wellbore.

A portion of a wellbore may be an open hole or cased hole. In an open-hole wellbore portion, a tubing string may be placed into the wellbore. The tubing string allows fluids to be introduced into or flowed from a remote portion of the wellbore. In a cased-hole wellbore portion, a casing is placed into the wellbore, which can also contain a tubing string. A wellbore can contain an annulus. Examples of an annulus include, but are not limited to: the space between the wellbore and the outside of a tubing string in an open-hole wellbore; the space between the wellbore and the outside of a casing in a cased-hole wellbore; and the space between the inside of a casing and the outside of a tubing string in a cased-hole wellbore.

During well completion, it is common to introduce a cement composition into an annulus in a wellbore. For example, in a cased-hole wellbore, a cement composition can be placed into and allowed to set in an annulus between the wellbore and the casing in order to stabilize and secure the casing in the wellbore. By cementing the casing in the wellbore, fluids are prevented from flowing into the annulus. Consequently, oil or gas can be produced in a controlled manner by directing the flow of oil or gas through the casing and into the wellhead. Cement compositions can also be used in primary or secondary cementing operations, well-plugging, squeeze cementing, or gravel packing operations.

It is common to include a filler in a cement composition. The filler can help reduce the overall cost of the cement composition. One type of filler that is commonly included in a cement composition is a pozzolan. As used herein, a "pozzolan" is a siliceous or siliceous and aluminous material which, in itself, possesses little or no cementitious value but which will, in finely divided form and in the presence of water, chemically react with a source of calcium at a temperature of 71° F. (22° C.) to form compounds possessing cementitious properties. As used herein, the phrase "cementitious properties" means the ability to bind materials together and set. It is to be understood that the term "pozzolan" does not necessarily indicate the exact chemical make-up of the material, but rather refers to its capability of reacting with a source of calcium and water to form compounds possessing cementitious properties. When a pozzolan is mixed with water, the silicate phases of the pozzolan can undergo a hydration reaction and form hydration products of calcium silicate hydrate (often abbreviated as C—S—H) and also possibly calcium aluminate hydrate. A pozzolan in general is less expensive than cement and can generally be included in a cement composition up to 40% by weight of the cement. Therefore, a pozzolan can not only decrease the overall cost of the cement composition, but also will not cause adverse effects to the desirable properties of the cement composition (e.g., the compressive strength or setting time).

The degree to which a material functions as a pozzolan can be determined by the material's pozzolanic activity. The pozzolanic activity of a pozzolan is the reaction rate between the pozzolan and a source of calcium (e.g., $Ca^{2+}$, calcium oxides "CaO", or calcium hydroxides "$Ca(OH)_2$") in the presence of water. The pozzolanic activity can be measured by determining the amount of calcium the pozzolan consumes over time or by determining the compressive strength of a pozzolan composition containing the pozzolan and water or a cement composition containing cement, the pozzolan, a source of calcium, and water.

The pozzolanic activity is dependent on some of the characteristics of the pozzolan, such as the chemical composition of the pozzolan, and the particle size, which also determines the specific surface area, of the pozzolan particles. As used herein, the term "particle size" refers to the volume surface mean diameter ("$D_s$"), which is related to the specific surface area of the particle. The volume surface mean diameter may be defined by the following equation: $D_s = 6/(\Phi_s A_w \rho_p)$, where $\Phi_s$=sphericity; $A_w$=specific surface area; and $\rho_p$=particle density.

If any test (e.g., setting time or compressive strength) requires the step of mixing, then the cement composition is "mixed" according to the following procedure. The water is added to a mixing container and the container is then placed on a mixer base. The motor of the base is then turned on and maintained at 4,000 revolutions per minute (rpm). The cement and any other ingredients are added to the container at a uniform rate in not more than 15 seconds (s). After all the cement and any other ingredients have been added to the water in the container, a cover is then placed on the container, and the cement composition is mixed at 12,000 rpm (+/−500 rpm) for 35 s (+/−1 s). It is to be understood that the cement composition is mixed at ambient temperature and pressure (about 71° F. (22° C.) and about 1 atm (0.1 MPa)).

It is also to be understood that if any test (e.g., setting time or compressive strength) requires the test be performed at a specified temperature and possibly a specified pressure, then the temperature and pressure of the cement composition is ramped up to the specified temperature and pressure after being mixed at ambient temperature and pressure. For example, the cement composition can be mixed at 71° F. (22° C.) and 1 atm (0.1 MPa) and then placed into the testing apparatus and the temperature of the cement composition can be ramped up to the specified temperature. As used herein, the rate of ramping up the temperature is in the range of about 3° F./min to about 5° F./min (about 1.67° C./min to about 2.78° C./min). After the cement composition is ramped up to the specified temperature and possibly specified pressure, the cement composition is maintained at that temperature and pressure for the duration of the testing.

Cement composition compressive strengths can vary from 0 psi to over 10,000 psi (0 to over 69 MPa). Compressive strength is generally measured at a specified time after the composition has been mixed and at a specified temperature and pressure. Compressive strength can be measured, for example, at a time of 24 hours. The non-destructive compressive strength method continually measures correlated compressive strength of a cement composition sample throughout the test period by utilizing a non-destructive sonic device such as an Ultrasonic Cement Analyzer (UCA) available from FANN® Instruments in Houston, Tex., USA. As used herein, the "compressive strength" of a cement composition is measured using the non-destructive method at a specified time, temperature, and pressure as follows. The cement composition is mixed. The cement composition is then placed in an Ultrasonic Cement Analyzer and tested at a specified temperature and pressure. The UCA continually measures the transit time of the acoustic signal through the sample. The UCA device contains preset algorithms that correlate transit time to compressive strength. The UCA reports the compressive strength of the cement composition in units of pressure, such as pounds force per square inch "psi" or megapascals "MPa".

The compressive strength of a cement composition can be used to indicate whether the cement composition has initially set or set. As used herein, a cement composition is considered "initially set" when the cement composition develops a compressive strength of 50 psi (0.3 MPa) at a specified temperature and pressure. As used herein, the "initial setting time" is the difference in time between when the cement and any other ingredients are added to the water and when the composition is initially set.

As used herein, the term "set," and all grammatical variations thereof, are intended to mean the process of becoming hard or solid by curing. As used herein, the "setting time" is the difference in time between when the cement and any other ingredients are added to the water and when the composition has set at a specified temperature and pressure. It can take up to 48 hours or longer for a cement composition to set. Some cement compositions can continue to develop compressive strength over the course of several days.

Strength retrogression is a decline in the compressive strength of a cement composition over time, especially at elevated temperatures. The decline is more pronounced at temperatures above 230° F. (110° C.). Therefore, it is common to include a strength retrogression inhibitor in a cement composition. The additive can function to inhibit or prevent the decline of the compressive strength over time. However, strength retrogression inhibitors are generally not a pozzolan. This means that in order to reduce the cost of a cement composition while still maintaining the desirable properties of the composition, both, a pozzolan and a strength retrogression inhibitor must be included in the composition for use in higher-temperature wells. The addition of two separate additives may not reduce the cost as much as may be desirable and requires more time by having to incorporate both additives into the cement composition.

Therefore, there is a need for an additive that can be included in a cement composition that functions both as a pozzolan and as a strength retrogression inhibitor. It has been discovered that an additive that functions as a pozzolan and a strength retrogression inhibitor can be included in a cement composition. Some of the advantages of including the additive in a cement composition are the cement composition can: retain desirable properties, be more cost effective, develop a desired compressive strength, and maintain the desired compressive strength over time (especially in higher-temperature wells).

According to an embodiment, a method of cementing in a subterranean formation comprises: introducing a cement composition into the subterranean formation, wherein the cement composition comprises: cement; water; and an additive, wherein the additive is a pozzolan and a strength-retrogression inhibitor; and allowing the cement composition to set, wherein the step of allowing is performed after the step of introducing.

According to another embodiment, a method of cementing in a subterranean formation comprises: introducing a cement composition into the subterranean formation, wherein the cement composition comprises: cement; water; and an additive, wherein the additive is a pozzolan and a strength-retrogression inhibitor, and wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa), wherein a test cement composition consisting essentially of: the cement; the water; and the additive, and in the same proportions as in the cement composition develops a compressive strength of at least 1,800 psi (12.4 MPa) when tested at 24 hours, a temperature of 190° F. (88° C.), and a pressure of 3,000 psi (20.7 MPa), and wherein the compressive strength of the test cement composition at a final time of 72 hours has a percent change greater than −5% from the compressive strength of the test cement composition at an initial time of 24 hours when tested at a temperature of 300° F. (149° C.) and a pressure of 3,000 psi (20.7 MPa); and allowing the cement composition to set, wherein the step of allowing is performed after the step of introducing.

According to another embodiment, a cement composition comprises: cement; water; and an additive, wherein the additive is a pozzolan and a strength-retrogression inhibitor, and wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa).

The discussion of preferred embodiments regarding the cement composition or any ingredient in the cement composition, is intended to apply to all of the composition embodiments and method embodiments. It is to be understood that for any preferred embodiment given for a physical/mechanical property of the cement composition (e.g., setting time or compressive strength), then the additive should be in at least a sufficient concentration and the particle size of the additive should be chosen such that the cement composition develops the preferred physical/mechanical property. Any reference to the unit "gallons" means U.S. gallons.

The cement composition includes cement. The cement can be a hydraulic cement. A variety of hydraulic cements may be utilized in accordance with the present invention, including, but not limited to, those comprising calcium, aluminum, silicon, oxygen, iron, and/or sulfur, which set and harden by a reaction with water. Suitable hydraulic cements include, but are not limited to, Portland cements, gypsum cements, high alumina content cements, slag cements, high magnesia content cements, and combinations thereof. In certain embodiments, the hydraulic cement may comprise a Portland cement. In some embodiments, the Portland cements that are suited for use in the present invention are classified as Classes A, C, H, and G cements according to American Petroleum Institute, API Specification for Materials and Testing for Well Cements, API Specification 10, Fifth Ed., Jul. 1, 1990. Preferably, the cement is Class G or Class H cement.

The cement composition includes water. The water can be selected from the group consisting of freshwater, brackish water, saltwater, and any combination thereof. The cement composition can further include a water-soluble salt. Preferably, the salt is selected from sodium chloride, calcium chloride, calcium bromide, potassium chloride, potassium bromide, magnesium chloride, and any combination thereof. The cement composition can contain the water-soluble salt in a concentration in the range of about 5% to about 36% by weight of the water (ww).

The cement composition includes the additive. The additive is a pozzolan. The additive is also a strength retrogression inhibitor. The additive can be composed of a naturally-occurring earth material, such as a clay or soil. One commercially-available example of a suitable additive is called red brick powder "RBP", available in India. The RBP is formed by mixing a red soil found in India with water and possibly other ingredients such as sand and lime, and then shaping the mixture into the desired shape and size. The formed bricks are then fired to achieve the desired strength and are commonly used in the construction industry. The additive can include at least the compounds silicon dioxide ($SiO_2$), iron III oxide ($Fe_2O_3$), and aluminum oxide ($Al_2O_3$). According to an embodiment, the additive contains additional compounds. Examples of additional compounds include, but are not limited to, magnesium oxide (MgO), phosphorus pentoxide ($P_2O_5$), sulfur trioxide ($SO_3$), potassium oxide ($K_2O$), calcium oxide (CaO), titanium dioxide ($TiO_2$), manganese II oxide (MnO), and combinations thereof in any proportion. Preferably, the $SiO_2$, $Fe_2O_3$, and $Al_2O_3$, comprise at least 70% of the total chemical composition of the additive. The $SiO_2$, $Fe_2O_3$, and $Al_2O_3$, can comprise between 70% to 100% of the total chemical composition of the additive. The concentration of the $SiO_2$, $Fe_2O_3$, and $Al_2O_3$, can be a percentage such that the additive is a pozzolan and a strength retrogression inhibitor. The $SiO_2$ can be in a concentration in the range of about 40% to about 60% of the total chemical composition of the additive. The $Fe_2O_3$ can be in a concentration in the range of about 15% to about 25% of the total chemical composition of the additive. The $Al_2O_3$ can be in a concentration in the range of about 5% to about 15% of the total chemical composition of the additive.

The $SiO_2$ can have a concentration of about 50% to about 88%, preferably about 60% to about 70%, of the total amount of the $SiO_2$, $Fe_2O_3$, and $Al_2O_3$. According to an embodiment, the $SiO_2$ is in a concentration of 63% of the total amount of the $SiO_2$, $Fe_2O_3$, and $Al_2O_3$. The $Fe_2O_3$ can have a concentration of about 2% to about 30%, preferably about 4% to about 25%, of the total amount of the $SiO_2$, $Fe_2O_3$, and $Al_2O_3$. According to an embodiment, the $Fe_2O_3$ is in a concentration of 24% of the total amount of the $SiO_2$, $Fe_2O_3$, and $Al_2O_3$. The $Al_2O_3$ can have a concentration of about 10% to about 35%, preferably about 14% to about 30%, of the total amount of the $SiO_2$, $Fe_2O_3$, and $Al_2O_3$. According to an embodiment, the $Al_2O_3$ is in a concentration of 14% of the total amount of the $SiO_2$, $Fe_2O_3$, and $Al_2O_3$.

The ratio of $SiO_2$ to $Fe_2O_3$ to $Al_2O_3$ can be in the range of 1:0.1:0.2 to 1:0.4:0.4, preferably 1:0.2:0.2 to 1:0.35:0.3. According to an embodiment, the ratio of $SiO_2$ to $Fe_2O_3$ to $Al_2O_3$ is 1:0.3:0.2. The ratio of $SiO_2$ to $Fe_2O_3$ to $Al_2O_3$ can be a ratio such that the additive is a pozzolan and a strength retrogression inhibitor.

According to an embodiment, a mixture consisting essentially of: the additive; water; and a source of calcium develops a compressive strength of at least 500 pounds force per square inch "psi" (3.4 megapascals "MPa"), preferably at least 750 psi (5.2 MPa), at a time of 24 hours, a temperature of 190° F. (88° C.), and a pressure of 3,000 psi (20.7 MPa). The compressive strength of the mixture can be an indicator of the pozzolanic activity of the additive. The source of calcium can be lime. The lime can be slaked lime or hydrated lime.

As a pozzolan, the additive can react with a source of calcium to form compounds possessing cementitious properties in the cement composition. The source of calcium can be $Ca^{2+}$. The cement can provide the source of calcium for the additive. The source of calcium can be calcium oxide "CaO" or calcium hydroxide "$Ca(OH)_2$" and can be the product of a reaction between the cement and the water. The source of calcium can also come from another additive, such as lime. According to this embodiment, the cement composition or the additive can further include lime. The lime can be slaked lime or hydrated lime. The amount of calcium present in the cement composition can be a sufficient amount such that the additive is capable of reacting with the calcium to yield compounds possessing cementitious properties.

The amount of pozzolanic activity of the additive can vary. One of the factors determining the amount of pozzolanic activity of the additive can be the particle size of the additive. According to an embodiment, the particle size of the additive is selected such that the mixture consisting essentially of: the additive; water; and the source of calcium develops a compressive strength of at least 500 psi (3.4 MPa), preferably at least 750 psi (5.2 MPa), at a time of 24 hours, a temperature of 190° F. (88° C.), and a pressure of 3,000 psi (20.7 MPa). According to another embodiment, the particle size of the additive is selected such that the cement composition develops a compressive strength of at least 2,000 psi (13.8 MPa) at a time of 24 hours, a temperature of 190° F. (88° C.), and a pressure of 3,000 psi (20.7 MPa). The additive can be a bulk particle. As used herein, a "bulk particle" is a particle having a particle size of greater than 1 micrometer (1 µm or 1 micron). The additive can also have a particle size distribution such that at least 90% of the additive has a particle size in the range of about 30 microns to 75 microns. Preferably, the additive has a particle size distribution such that at least 90% of the additive has a particle size of about 70 microns. If the additive is from a brick, then the brick can be ground to obtain the desired particle size.

According to an embodiment, a test cement composition consisting essentially of: the cement; the water; and the additive, and in the same proportions as in the cement composition develops a compressive strength of at least 1,800 psi (12.4 MPa), preferably at least 2,200 psi (15.2 MPa) when tested at 24 hours, a temperature of 190° F. (88° C.), and a pressure of 3,000 psi (20.7 MPa). The particle size of the additive and the concentration of the additive can be selected such that the test cement composition develops a compressive strength of at least 1,800 psi (12.4 MPa), preferably at least 2,200 psi (15.2 MPa) under the testing conditions.

According to another embodiment, the cement composition develops a compressive strength of at least 1,800 psi (12.4 MPa), preferably at least 2,200 psi (15.2 MPa) when tested at 24 hours, a temperature of 190° F. (88° C.), and a pressure of 3,000 psi (20.7 MPa). The particle size of the additive and the concentration of the additive can be selected such that the cement composition develops a compressive strength of at least 1,800 psi (12.4 MPa), preferably at least 2,200 psi (15.2 MPa) under the testing conditions.

Preferably, the test cement composition or the cement composition has a similar compressive strength compared to a control cement composition consisting of cement and water at a time of 6, 12, 24, 28, or 72 hours, a temperature of 300° F. (149° C.), and a pressure of 3,000 psi (20.7 MPa). The test cement composition or the cement composition can also have a compressive strength of +/−20% of the compressive strength of the control cement composition at any time, a temperature of 300° F. (149° C.), and a pressure of 3,000 psi (20.7 MPa).

The additive is a strength retrogression inhibitor. Therefore, the additive can inhibit or prevent a decrease of the compressive strength of the test cement composition or the cement composition over a period of time. The period of time can be a time from 24 hours (hrs) to 72 hrs. The period of time can also be a time from mixing of the cement composition to the time the cement composition is no longer needed for use. The period of time can also be from a time of 12 hrs to a time of 14 days. The percent change in the cement composition's compressive strength over time can be used to indicate the effectiveness of the additive as a strength retrogression inhibitor. According to an embodiment, the compressive strength of the test cement composition or the cement composition at a final time of 72 hours has a percent change greater than −5% from the compressive strength of the test cement composition at an initial time of 24 hours when tested at a temperature of 300° F. (149° C.) and a pressure of 3,000 psi (20.7 MPa). As used herein the percent change of the compressive strength of a cement composition is calculated according to the following equation:

$$\% \text{ change} = ((\text{final} - \text{initial})/\text{initial}) * 100\%$$

where final is the compressive strength of the cement composition measured at the specified final time listed, and initial is the compressive strength of the cement composition measured at the specified initial time. The percent change can be a positive number or a negative number. If the number is positive, then the compressive strength has increased from the initial time to the final time. Conversely, if the number is negative, then the compressive strength has decreased from the initial time to the final time. Therefore, according to the embodiment wherein the compressive strength at a final time of 72 hours has a percent change greater than −5% from the initial time of 24 hours means that the compressive strength does not decrease by more than 5%. According to a preferred embodiment, and keeping the testing parameters and final and initial times the same, the percent change is a positive number (i.e., 0 or greater), more preferably the percent change is greater than +2%. According to another embodiment, the percent change of the compressive strength of the test cement composition or the cement composition is at least 20%, preferably at least 30%, more preferably at least 40%, greater than the percent change of the compressive strength of a control cement composition or a control cement composition further containing a traditional pozzolan, such as fly ash. By way of example, a control cement composition consisting of cement and water can have a percent change at a final time of 72 hours and an initial time of 24 hours of −10%; whereas the test cement composition or cement composition can have a percent change at the same times of 4%—in which case the percent change of the test or cement composition is 40% greater than that of the control. By way of another example, a first cement composition consisting of cement, water, and fly ash can have a percent change at a final time of 72 hours and an initial time of 24 hours of −9%; whereas the test cement composition or cement composition can have a percent change at the same times of 4%—in which case the percent change of the test or cement composition is 44% greater than that of the first composition.

According to another embodiment, the compressive strength of the test cement composition or the cement composition at a final time of 72 hours has a percent change greater than 20% from the compressive strength of the test cement composition at an initial time of 6 hours when tested at a temperature of 300° F. (149° C.) and a pressure of 3,000 psi (20.7 MPa).

The concentration of the additive can vary. The concentration of the additive can be selected such that the percent change of the compressive strength of the test cement composition or the cement composition is in a desired range. Preferably, the desired range is from −5% to 10% at a final time of 72 hrs and an initial time of 24 hrs. The desired range can also be from 0% to 60% at a final time of 72 hrs and an initial time of 6 hrs. The additive can be in a concentration of at least 2% by weight of the cement (bwoc). In another embodiment, the additive is in a concentration in the range of about 2% to about 70% bwoc. In yet another embodiment, the additive is in a concentration in the range of about 10% to about 35% bwoc. According to another embodiment, the additive is in at least a sufficient concentration such that the compressive strength of the cement composition at a final time of 72 hours has a percent change greater than 20%, preferably greater than 30%, more preferably greater than 40%, from an initial time of 6 hours when tested at a temperature of 300° F. (149° C.) and a pressure of 3,000 psi (20.7 MPa). According to another embodiment, the additive is in at least a sufficient concentration such that the compressive strength of the cement composition at a final time of 72 hours has a percent change greater than −5%, preferably greater than 0%, more preferably greater than 3%, from an initial time of 24 hours when tested at a temperature of 300° F. (149° C.) and a pressure of 3,000 psi (20.7 MPa).

According to another embodiment, the additive is in at least a sufficient concentration such that the test cement composition or the cement composition develops a compressive strength of at least 1,800 psi (12.4 MPa), preferably at least 2,200 psi (15.2 MPa) when tested at 24 hours, a temperature of 190° F. (88° C.), and a pressure of 3,000 psi (20.7 MPa).

In an embodiment, the cement composition is in a pumpable state prior to and during introduction into the subterranean formation.

According to an embodiment, the cement composition has an initial setting time of less than 24 hours, more preferably less than 12 hours, at a temperature of 300° F. (149° C.) and a pressure of 3,000 psi (20.7 MPa). In another embodiment, the cement composition has an initial setting time of less than 24 hours, more preferably less than 12 hours, at the bottomhole temperature and pressure of the subterranean formation. As used herein, the term "bottomhole" refers to the portion of the subterranean formation to be cemented.

The cement composition can have a setting time of less than 48 hours, preferably less than 24 hours, more preferably less than 12 hours, at a temperature of 300° F. (149° C.) and a pressure of 3,000 psi (20.7 MPa). According to another embodiment, the cement composition has a setting time of less than 48 hours, preferably less than 24 hours, more preferably less than 12 hours, at the bottomhole temperature and pressure of the subterranean formation.

According to an embodiment, the cement composition has a compressive strength of at least 1,800 psi (12.4 MPa), preferably at least 2,200 psi (15.2 MPa), at 24 hours, a temperature of 300° F. (149° C.) and a pressure of 3,000 psi (20.7 MPa). According to another embodiment, the cement composition has a compressive strength in the range of about 1,000 to about 5,000 psi (about 3.5 to about 34.5 MPa) at the bottomhole temperature and pressure of the subterranean formation.

The cement composition can further include other additives. Examples of other additives include, but are not limited to, a fluid loss additive, a set retarder, a set accelerator, a friction reducer, a light-weight additive, a defoaming agent, a high-density additive, elastomers, a mechanical property enhancing additive, a lost-circulation material, a filtration-control additive, a gas migration control additive, a thixotropic additive, a viscosifying additive, and combinations thereof.

The cement composition can include a fluid loss additive. Suitable examples of commercially-available fluid loss additives include, but are not limited to, and are marketed by Halliburton Energy Services, Inc. under the tradenames HALAD®-344, HALAD®-413, and HALAD®-300. Preferably, the fluid loss additive is in a concentration in the range of about 0.05% to about 10% bwoc.

The cement composition can include a set retarder. Suitable examples of commercially-available set retarders include, but are not limited to, and are marketed by Halliburton Energy Services, Inc. under the tradenames HR®-4, HR®-5, HR®-6, HR®-12, HR®-20, HR®-25, SCR-100™, and SCR-500™. Preferably, the set retarder is in a concentration in the range of about 0.05% to about 10% bwoc.

The cement composition can include a friction reducer. Suitable examples of commercially-available friction reducers include, but are not limited to, and are marketed by Halliburton Energy Services, Inc. under the tradenames CFR-2™, CFR-3™, CFR-5LE™, CFR-6™, and CFR-8™. Preferably, the friction reducer is in a concentration in the range of about 0.1% to about 10% bwoc.

Commercially-available examples of other additives include, but are not limited to, and are marketed by Halliburton Energy Services, Inc. under the tradenames SPHER-ELITE® and LUBRA-BEADS® FINE, light-weight additives; HIGH DENSE® No. 3, HIGH DENSE® No. 4, BARITE™, and MICROMAX™, heavy-weight additives; SILICALITE™, extender and compressive-strength enhancer; WELLLIFE® 665, WELLLIFE® 809, and WELLLIFE® 810 mechanical property enhancers.

In one embodiment, the cement composition has a density of at least 8 pounds per gallon (ppg) (0.96 kilograms per liter (kg/l)). In another embodiment, the cement composition has a density of at least 15 ppg (1.8 kg/l). In another embodiment, the cement composition has a density in the range of about 8 to about 20 ppg (about 1.8 to about 2.4 kg/l).

The method embodiments include the step of introducing the cement composition into a subterranean formation. The step of introducing can be for the purpose of at least one of the following: well completion; foam cementing; primary or secondary cementing operations; well-plugging; squeeze cementing; and gravel packing. In one embodiment, the subterranean formation is penetrated by a well. The well can be, without limitation, an oil, gas, or water production well, or an injection well. According to this embodiment, the step of introducing includes introducing the cement composition into the well. According to another embodiment, the subterranean formation is penetrated by a well and the well includes an annulus. According to this other embodiment, the step of introducing includes introducing the cement composition into a portion of the annulus.

The method embodiments can further comprise the step of forming the cement composition prior to the step of introducing. According to this embodiment, the step of forming can comprise: adding at least the cement, the water, and the additive to a mixing apparatus; and mixing the cement composition. The step of forming can further include adding other additives to form the cement composition. The step of mixing can be performed using a suitable mixing apparatus.

The method embodiments also include the step of allowing the cement composition to set. The step of allowing can be performed after the step of introducing the cement composition into the subterranean formation. The method embodiments can include the additional steps of perforating, fracturing, or performing an acidizing treatment, after the step of allowing.

The cement composition and additive can be used in a variety of wells. Even though the additive is more suited for use in higher-temperature environments, the additive can be used in lower-temperature environments as well. The subterranean formation can have a bottomhole temperature in the range of about 35° F. to about 450° F. (about 2° C. to about 232° C.).

EXAMPLES

To facilitate a better understanding of the preferred embodiments, the following examples of certain aspects of the preferred embodiments are given. The following examples are not the only examples that could be given according to the preferred embodiments and are not intended to limit the scope of the invention.

For the data contained in the following tables, the concentration of any ingredient in a mixture or cement composition can be expressed as, by weight of the water (abbreviated as "bwow"), by weight of the cement (abbreviated as "bwoc"), or gallons per sack (abbreviated as "gal/sk"). The additive was red brick powder "RBP" available in India. The RBP was sifted through a 200 mesh sieve to obtain a particle size less than or equal to 74 microns. The RBP had a ratio of $SiO_2$ to $Fe_2O_3$ to $Al_2O_3$ of 1:0.38:0.22. POZMIX® A is a fly ash, marketed by Halliburton Energy Services, Inc. SSA-2™ strength-retrogression inhibitor is a course silica flour from Oklahoma No. 1 dry sand, marketed by Halliburton Energy Services, Inc.

Unless otherwise stated, each of the cement compositions had a density of 15.8 pounds per gallon (lb/gal) (1.89 kg/l) and contained at least the following ingredients: varying concentrations of deionized water and Dyckerhoff Class G cement or slag cement. Some of the cement compositions further contained the additive, POZMIX® A pozzolan cement additive, or SSA-2™ strength-retrogression inhibitor.

Unless stated otherwise, all of the mixtures and cement compositions were mixed and tested according to the procedure for the specific test as described in The Detailed Description section above. The cement compositions were tested for initial setting time and compressive strength at a variety of times, 190° F. (88° C.) or 300° F. (149° C.), and a pressure of 3,000 psi (20.7 MPa).

Table 1 contains the chemical composition and percentages of RBP as determined by X-ray fluorescence (XRF) analysis.

TABLE 1

| Chemical Compound | % |
|---|---|
| $SiO_2$ | 50.9 |
| $Fe_2O_3$ | 19.4 |
| $Al_2O_3$ | 11.1 |
| MgO | 2.0 |
| $P_2O_5$ | 0.5 |
| $SO_3$ | 2.0 |
| $K_2O$ | 1.0 |
| CaO | 9.6 |
| $TiO_2$ | 3.0 |
| MnO | 0.3 |

As can be seen in Table 1, $SiO_2$, $Fe_2O_3$, and $Al_2O_3$ have a ratio of 1:0.38:0.22 and are in a percentage of 63%, 24% and 14% respectively of the total of those three ingredients.

The test for Table 2 was conducted to determine the pozzolanic activity of RBP. A mixture was prepared containing deionized water at a concentration of 67.77% by weight of the additive (RBP); the additive RBP; lime at a concentration of 25% by weight of the additive; and ETHACRYL® M dispersant, available from Coatex, LLC. in Chester, USA. The initial setting time and compressive strength of the mixture was tested at 24 hours (hrs), a temperature of 190° F. (88° C.), and a pressure of 3,000 psi (20.7 MPa).

TABLE 2

| Intital Setting Time (hrs:min) | Compressive Strength (psi) |
|---|---|
| 2:50 | 766 |

As can be seen in Table 2, the additive mixture had an initial setting time of 2 hours and 50 minutes. The mixture also had a 24 hr compressive strength of 766 psi (5.3 MPa). This indicates that the additive is a pozzolan, exhibiting very good pozzolanic activity.

Table 3 contains the concentration of POZMIX® A pozzolan cement additive and RBP additive, initial setting time, and compressive strength data at a time of 24 hrs, a temperature of 190° F. (88° C.), and a pressure of 3,000 psi (20.7 MPa) for several cement compositions to evaluate the pozzolanic activity of the RBP additive compared to POZMIX® A pozzolan cement additive in a cement composition. The cement compositions contained deionized water; cement; and possibly a pozzolan additive of either POZMIX® A or RBP. Cement compositions #1-4 contained Class G cement and cement compositions #5 and 6 contained Slag cement. The Slag cement contained a higher calcium content compared to the Class G cement.

TABLE 3

| Cement Composition # | POZMIX® A Concentration (% bwoc) | RBP Concentration (% bwoc) | Initial Setting Time (hrs:min) | Compressive Strength (psi) |
|---|---|---|---|---|
| 1 | — | — | 2:03 | 2,517 |
| 2 | 30 | — | 2:19 | 3,493 |
| 3 | — | 15 | 1:45 | 2,409 |
| 4 | — | 30 | 1:23 | 3,004 |
| 5 | 30 | — | 1:28 | 6,058 |
| 6 | — | 30 | 0:58 | 5,643 |

As can be seen in Table 3, cement composition #2 had a slightly higher initial setting time and a higher compressive strength compared to the control cement composition #1 that did not contain a pozzolan additive. Both, cement compositions #3 and 4, had a lower initial setting time compared to the control cement composition #1. This indicates that RBP functions very effectively as a pozzolan and does not delay the initial setting time of a cement composition. As can also be seen in Table 3, cement composition #3 had a comparable compressive strength and cement composition #4 had a higher compressive strength compared to the control cement composition #1. This indicates that the concentration of the additive can be adjusted to provide a desired compressive strength to a cement composition. As can also be seen in Table 3, the additive works very well with Slag cement. Both, cement compositions #5 and 6 exhibited much higher compressive strengths compared to the cement compositions #1-4 containing Class G cement. This indicates that a cement having a higher calcium content can be used, wherein there may be more available calcium for reacting with the additive in order to increase the pozzolanic activity of the additive and increasing the overall compressive strength of the cement composition. The use of a higher calcium content cement may be useful when a higher compressive strength is desired.

The tests for Table 4 were conducted to determine the effectiveness of the additive as a strength retrogression inhibitor. Table 4 contains the type of additive; the compressive strength for several cement compositions at times of 6, 12, 24, 48, and 72 hours; the percent change for each cement composition at a final time of 72 hrs and an initial time of 6 hrs; and the percent change for each cement composition at a final time of 72 hrs and an initial time of 24 hrs. The control cement composition #1 contained only Class G cement and deionized water. Cement compositions #2, 3, and 4 further contained either POZMIX® A pozzolan cement additive; SSA-2™ strength-retrogression inhibitor; or the additive of RBP at a concentration of 35% bwoc. The compressive strength testing was performed at a temperature of 300° F. (149° C.) and a pressure of 3,000 psi (20.7 MPa). The percent change of the compressive strength of a particular cement composition at a final time from the initial time was calculated as follows:

% change=((final−initial)/initial)*100% where final is the compressive strength of the cement composition at the time of 72 hrs, and initial is the compressive strength of the cement composition at the initial time listed (i.e., 6 hrs or 24 hrs). By way of example, the % change of RBP from the final time of 72 hrs from the initial time of 24 hrs was calculated as: % change=((2,309−2,215)/2,215)*100% for a value of 4%.

TABLE 4

| Cement Comp. # | Type of Additive | Compressive Strength (psi) | | | | | % change 6-72 hrs | % change 24-72 |
|---|---|---|---|---|---|---|---|---|
| | | 6 hrs | 12 hrs | 24 hrs | 48 hrs | 72 hrs | | |
| 1 | Control | 1,731 | 2,442 | 2,748 | 2,609 | 2,470 | 43% | −10% |
| 2 | POZMIX® A | 2,058 | 2,510 | 2,648 | 2,350 | 2,418 | 17% | −9% |
| 3 | SSA-2™ | 1,569 | 2,023 | 2,267 | 2,292 | 2,275 | 45% | 0% |
| 4 | RBP | 1,621 | 1,968 | 2,215 | 2,317 | 2,309 | 42% | 4% |

As can be seen in Table 4, cement compositions #2-4 had comparable compressive strengths at each time compared to the control cement composition #1. However, cement composition #4 had slightly higher compressive strengths at times 6, 48, and 72 hrs compared to cement composition #3. This indicates that RBP has a higher pozzolanic activity compared to SSA-2™ strength-retrogression inhibitor. As can also be seen in Table 4, the control cement composition and cement composition #2 containing POZMIX® A pozzolan cement additive of fly ash had a negative % change at a final time of 72 hrs from an initial time of 24 hrs. This indicates strength retrogression at the later time of compressive strength development for these compositions. Conversely, cement compositions #3 and 4 had positive % changes indicating the effectiveness of SSA-2™ strength-retrogression inhibitor and the RBP as a strength retrogression inhibitor at the later time of development. Moreover, cement composition #4 exhibited a higher % change from an initial time of 24 hrs compared to cement composition #3. This indicates that RBP additive functions more effectively at later stages of strength development compared to SSA-2™ as a strength-retrogression inhibitor. Cement compositions #3 and 4 had comparable % change at the initial time of 6 hrs compared to the control composition; whereas composition #2 had a significantly lower % change. This indicates that a traditional pozzolan, such as fly ash, does not function as a strength retrogression inhibitor. Additionally, it can be seen from the data contained in all of the Tables, the RBP additive functions very effectively as a pozzolan and as a strength retrogression inhibitor in a variety of cements and a variety of temperatures.

The exemplary fluids and additives disclosed herein may directly or indirectly affect one or more components or pieces of equipment associated with the preparation, delivery, recapture, recycling, reuse, and/or disposal of the disclosed fluids and additives. For example, the disclosed fluids and additives may directly or indirectly affect one or more mixers, related mixing equipment, mud pits, storage facilities or units, fluid separators, heat exchangers, sensors, gauges, pumps, compressors, and the like used generate, store, monitor, regulate, and/or recondition the exemplary fluids and additives. The disclosed fluids and additives may also directly or indirectly affect any transport or delivery equipment used to convey the fluids and additives to a well site or downhole such as, for example, any transport vessels, conduits, pipelines, trucks, tubulars, and/or pipes used to fluidically move the fluids and additives from one location to another, any pumps, compressors, or motors (e.g., topside or downhole) used to drive the fluids and additives into motion, any valves or related joints used to regulate the pressure or flow rate of the fluids, and any sensors (i.e., pressure and temperature), gauges, and/or combinations thereof, and the like. The disclosed fluids and additives may also directly or indirectly affect the various downhole equipment and tools that may come into contact with the fluids and additives such as, but not limited to, drill string, coiled tubing, drill pipe, drill collars, mud motors, downhole motors and/or pumps, floats, MWD/LWD tools and related telemetry equipment, drill bits (including roller cone, PDC, natural diamond, hole openers, reamers, and coring bits), sensors or distributed sensors, downhole heat exchangers, valves and corresponding actuation devices, tool seals, packers and other wellbore isolation devices or components, and the like.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of cementing in a subterranean formation comprising:
   introducing a cement composition into the subterranean formation, wherein the cement composition comprises:
      cement;
      water; and
      an additive, wherein the additive:
         is a pozzolan and a strength-retrogression inhibitor;
         is a red brick powder; and
         comprises at least the compounds silicon dioxide ($SiO_2$), iron III oxide ($Fe_2O_3$), and aluminum oxide ($Al_2O_3$), wherein the $SiO_2$ is in a concentration in the range of about 40% to about 60% of the total chemical composition of the additive; the $Fe_2O_3$ is in a concentration in the range of about 15% to about 25% of the total chemical composition of the additive; and the $Al_2O_3$ is in a concentration in the range of about 5% to about 15% of the total chemical composition of the additive,
   wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa); and
   allowing the cement composition to set, wherein the step of allowing is performed after the step of introducing.

2. The method according to claim 1, wherein the cement is selected from the group consisting of Portland cements, gypsum cements, high alumina content cements, slag cements, high magnesia content cements, and combinations thereof.

3. The method according to claim 1, wherein the water is selected from the group consisting of freshwater, brackish water, saltwater, and any combination thereof.

4. The method according to claim 1, wherein the $SiO_2$, $Fe_2O_3$, and $Al_2O_3$ comprise at least 70% of the total chemical composition of the additive.

5. The method according to claim 1, wherein the concentration of the $SiO_2$, $Fe_2O_3$, and $Al_2O_3$ is a percentage such that the additive is a pozzolan and a strength retrogression inhibitor.

6. The method according to claim 1, wherein the ratio of $SiO_2$ to $Fe_2O_3$ to $Al_2O_3$ is in the range of 1:0.2:0.2 to 1:0.35:0.3.

7. The method according to claim 1, wherein the ratio of $SiO_2$ to $Fe_2O_3$ to $Al_2O_3$ is a ratio such that the additive is a pozzolan and a strength retrogression inhibitor.

8. The method according to claim 1, wherein the particle size of the additive is selected such that the mixture consisting essentially of: the additive; water; and the source of calcium develops a compressive strength of at least 500 psi (3.4 MPa) at a time of 24 hours, a temperature of 190° F. (88° C.), and a pressure of 3,000 psi (20.7 MPa).

9. The method according to claim 1, wherein the particle size of the additive is selected such that the cement composition develops a compressive strength of at least 2,000 psi (13.8 MPa) at a time of 24 hours, a temperature of 190° F. (88° C.), and a pressure of 3,000 psi (20.7 MPa).

10. The method according to claim 1, wherein the additive has a particle size distribution such that at least 90% of the additive has a particle size in the range of about 30 microns to 75 microns.

11. The method according to claim 1, wherein the cement composition has a compressive strength in the range of −20% to +20% compared to a control cement composition consisting of cement and water at any time, a temperature of 300° F. (149° C.), and a pressure of 3,000 psi (20.7 MPa).

12. The method according to claim 1, wherein the compressive strength of a test cement composition consisting of the cement, the water, and the additive, at a final time of 72 hours has a percent change greater than 20% from the compressive strength of the test cement composition at an initial time of 6 hours when tested at a temperature of 300° F. (149° C.) and a pressure of 3,000 psi (20.7 MPa).

13. The method according to claim 1, wherein the concentration of the additive is selected such that a percent change of the compressive strength of a test cement composition consisting of the cement, the water, and the additive or of the cement composition is greater than −5% at a final time of 72 hours and an initial time of 24 hours.

14. The method according to claim 13, wherein the percent change is greater than +2%.

15. The method according to claim 1, wherein the additive is in a concentration in the range of about 2% to about 70% by weight of the cement.

16. The method according to claim 1, wherein the subterranean formation has a bottomhole temperature in the range of about 35° F. (2° C.) to about 450° F. (232° C.).

17. A method of cementing in a subterranean formation comprising:
introducing a cement composition into the subterranean formation, wherein the cement composition comprises:
cement;
water; and
an additive, wherein the additive;
is a pozzolan and a strength-retrogression inhibitor;
is a red brick powder; and
comprises at least the compounds silicon dioxide ($SiO_2$), iron III oxide ($Fe_2O_3$) and aluminum oxide ($Al_2O_3$), wherein the $SiO_2$ is in a concentration in the range of about 40% to about 60% of the total chemical composition of the additive; the $Fe_2O_3$ is in a concentration in the range of about 15% to about 25% of the total chemical composition of the additive; and the $Al_2O_3$ is in a concentration in the range of about 5% to about 15% of the total chemical composition of the additive, wherein a mixture consisting essentially of: the additive; water; and a source of calcium develops a compressive strength of at least 500 psi (3.4 MPa) at a time of 24 hours, a temperature of 190° F. (88° C.), and a pressure of 3,000 psi (20.7 MPa), wherein a test cement composition consisting essentially of: the cement; the water; and the additive, and in the same proportions as in the cement composition develops a compressive strength of at least 1,800 psi (12.4 MPa) when tested at 24 hours, a temperature of 190° F. (88° C.), and a pressure of 3,000 psi (20.7 MPa), and wherein the compressive strength of the test cement composition at a final time of 72 hours has a percent change greater than −5% from the compressive strength of the test cement composition at an initial time of 24 hours when tested at a temperature of 300° F. (149° C.) and a pressure of 3,000 psi (20.7 MPa); and
allowing the cement composition to set, wherein the step of allowing is performed after the step of introducing.

18. A method of cementing in a subterranean formation comprising:
introducing a cement composition into the subterranean formation, wherein the cement composition comprises:
cement;
water; and
an additive, wherein the additive is a pozzolan and a strength-retrogression inhibitor, wherein the additive includes at least the compounds silicon dioxide ($SiO_2$), iron III oxide ($Fe_2O_3$), and aluminum oxide ($Al_2O_3$), and wherein the ratio of $SiO_2$ to $Fe_2O_3$ to $Al_2O_3$ is in the range of 1:0.2:0.2 to 1:0.35:0.3; and
allowing the cement composition to set, wherein the step of allowing is performed after the step of introducing.

* * * * *